United States Patent
Futamoto et al.

(10) Patent No.: US 7,399,540 B2
(45) Date of Patent: *Jul. 15, 2008

(54) PERPENDICULAR MAGNETIC RECORDING MEDIA, MAGNETIC RECORDING APPARATUS

(75) Inventors: Masaaki Futamoto, Shiroyama (JP); Kazuetsu Yoshida, Hidaka (JP); Yukio Honda, Fuchu (JP); Yoshiyuki Hirayama, Kodaira (JP); Atsushi Kikugawa, Higashimurayama (JP)

(73) Assignee: Hitachi Global Storage Technologies Japan, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/582,327

(22) Filed: Oct. 18, 2006

(65) Prior Publication Data

US 2007/0037018 A1      Feb. 15, 2007

Related U.S. Application Data

(62) Division of application No. 10/664,870, filed on Sep. 22, 2003, now Pat. No. 7,147,941, which is a division of application No. 09/717,213, filed on Nov. 22, 2000, now Pat. No. 6,686,070.

(30) Foreign Application Priority Data

Nov. 26, 1999   (JP) ................................. 11-336117

(51) Int. Cl.
    *G11B 5/66* (2006.01)
(52) U.S. Cl. .................................................. 428/828.1
(58) Field of Classification Search ........................ None
    See application file for complete search history.

(56) References Cited

U.S. PATENT DOCUMENTS

| 4,687,712 A | 8/1987 | Sugita et al. ................. 428/611 |
| 5,226,966 A | 7/1993 | Mallary et al. ............... 118/623 |

(Continued)

FOREIGN PATENT DOCUMENTS

JP                60140525              7/1985

(Continued)

OTHER PUBLICATIONS

T. Nishihara, et al High SN Ratio and Signal-Stability in Triple Layer Perpendicular Media, Central R&D Center, JVC, pp. 104-108, no date available.

(Continued)

*Primary Examiner*—Holly Rickman
(74) *Attorney, Agent, or Firm*—Mattingly, Stanger, Malur & Brundidge, P.C.

(57) ABSTRACT

A perpendicular magnetic recording medium which has been improved to be suitable for high-density magnetic recording and a magnetic recording apparatus using the medium are provided. The magnetic back film of a dual-layer perpendicular recording medium is caused to be constituted by a plurality of layers, and a keeper layer 17 for keeping perpendicular magnetization and layers 13 and 15 for improving the recording efficiency of a recording head are functionally separated from one another. Further, the magnetization orientations of the soft magnetic films excluding the keeper layer are defined to be in the circumferential direction of the disk, whereby the frequency of occurrence of noise is decreased.

5 Claims, 5 Drawing Sheets

U.S. PATENT DOCUMENTS

| | | |
|---|---|---|
| 6,280,813 B1 * | 8/2001 | Carey et al. ............ 428/828 |
| 6,641,935 B1 * | 11/2003 | Li et al. ............ 428/828.1 |
| 6,686,070 B1 | 2/2004 | Futamoto et al. ............ 428/827 |
| 6,818,330 B2 | 11/2004 | Shukh et al. ............ 428/621 |
| 6,926,974 B2 * | 8/2005 | Kawato et al. ............ 428/828 |
| 7,147,941 B2 * | 12/2006 | Futamoto et al. ............ 428/828.1 |
| 2002/0028357 A1 | 3/2002 | Shukh et al. ............ 428/694 TM |

FOREIGN PATENT DOCUMENTS

| JP | 1227216 | 9/1989 |
|---|---|---|
| JP | 6103550 | 4/1994 |
| JP | 785442 | 3/1995 |
| JP | 10228620 | 8/1998 |

OTHER PUBLICATIONS

J. Desserre, "Crucial Points in Perpendicular Recording", IEEE Transactions on Magnetics, MAG-20, No. 5, Sep. 1994, pp. 663-668.

S. Iwasaki, "Perpendicular Magnetic Recording-Evolution and Future", IEEE Transactions on Magnetics, vol. MAG-20, No. 5, Sep. 1994, pp. 657-662.

* cited by examiner

Magnetization orientation (direction) in soft-magnetic layer observed at the A—A cross-section in Fig. 1.

Magnetization orientation (direction) in soft-magnetic layer observed at the B—B cross-section in Fig. 1.

Thickness of Fe-Ni, Co-Nb-Zr
Soft Magnetic Film (T$_m$ : nm)

PERPENDICULAR MAGNETIC RECORDING MEDIA, MAGNETIC RECORDING APPARATUS

The present application is a divisional application of application Ser. No. 10/664,870, filed Sep. 22, 2003, now U.S. Pat. No. 7,147,941; which is a divisional of application Ser. No. 09/717,213, filed Nov. 22, 2000, now U.S. Pat. No. 6,686,070, the contents of which are incorporated herein by reference.

BACKGROUND OF THE INVENTION

The present invention relates to a perpendicular magnetic recording medium which is suitable for high-density magnetic recording and a magnetic recording apparatus using the same.

DESCRIPTION OF THE RELATED ART

A magnetic disk storage device that has been actually used at present utilizes longitudinal magnetic recording. It is the technical problem to form longitudinal magnetic domains at high densities on a longitudinal magnetic recording medium which is easily magnetized in a direction parallel to a disc substrate, parallel to the surface of the disk substrate. To increase an areal recording density, particularly a linear recording density, in this recording mode, it is required to reduce the thickness of a magnetic film for recording while improving the coercivity of the longitudinal magnetic recording medium. When the coercivity is greater than 4 kOe, it becomes difficult to conduct recording by a magnetic head. Meanwhile, when the thickness of the magnetic film made of, for example, a Co alloy is equal to or smaller than 15 nm, intensity of recorded magnetization decreases with time due to thermal fluctuation. The longitudinal magnetic recording essentially has the problem that a magnetization transition region having wide boundaries is formed due to opposing magnetizations of adjacent recording bits. Therefore, mainly due to the above reasons, a technical difficulty is expected in order to achieve an areal recording density of 40 Gb/in$^2$ or higher.

The perpendicular magnetic recording, in which magnetization occurs in a direction perpendicular to the surface of a thin-film medium, differs from the conventional longitudinal magnetic recording in its recording principle and mechanism for causing a medium noise. Since adjacent magnetizations are antiparallel in the perpendicular magnetic recording, it has drawn attention as a recording mode that is essentially suitable for high-density magnetic recording, and a medium structure suitable for the perpendicular magnetic recording has been proposed. The perpendicular magnetic recording is classified into two types, one of which uses a single-layer perpendicular magnetization film and the other of which uses a perpendicular magnetization film having a magnetic back film formed thereon. The technique using a dual-layer perpendicular magnetic recording medium using the magnetic back film is described in, for example, IEEE Transaction on Magnetics, Vol. MAG-20, No. 5, September 1984, pp. 657-662, "Perpendicular Magnetic Recording-Evolution and Future". As the perpendicular magnetic recording medium for this recording mode, there has been considered a medium having a perpendicular magnetization film made of a Co—Cr alloy formed on a soft magnetic back film made of a Permalloy.

To commercialize a magnetic recording apparatus capable of high-density magnetic recording of 40 Gb/in$^2$ or higher by the perpendicular magnetic recording using the dual-layer perpendicular magnetic recording medium, it is essential to reduce the medium noise, secure a magnetic signal strength from recorded magnetization and improve the recording efficiency of a recording head.

The medium noise is manufactured from both the perpendicular magnetization film and the magnetic back film, and the spike noise manufactured from the magnetic back film has been particularly problematic. An example of such a noise is described in, for example, IEEE Transaction on Magnetics, Vol. MAG-20, No. 5, September 1984, pp. 663-668, "Crucial Points in Perpendicular Recording". To deal with such a problem, a method of forming a longitudinal magnetization film underneath the magnetic back film has been proposed in, for example, The Magnetics Society of Japan Journal, Vol. 21, Supplement No. S1, pp. 104-108, "Improvement in S/N of three-layer perpendicular medium and stability of recording signal". Such proposals have not been always satisfactory for commercializing a magnetic recording apparatus capable of high-density magnetic recording of 40 Gb/in$^2$ or higher.

As for securing the magnetic signal strength from recorded magnetization, although the dual-layer perpendicular magnetic recording medium can secure almost twice as much signal strength as the single-layer perpendicular magnetic recording medium having no soft magnetic back layer, it has had a problem with the spike noise which is inherent in the soft magnetic back layer as described above. In a magnetic recording system comprising the dual-layer perpendicular recording medium and a single pole-type recording head, it is necessary for improving the recording efficiency of the recording head to urge the quick regression of a magnetic flux, which has emerged from the recording pole, to the head after passing through the perpendicular magnetization film. For this reason, the soft magnetic back film must be at least several times thicker than the perpendicular magnetization film for recording.

SUMMARY OF THE INVENTION

It is the object of the present invention to provide a perpendicular magnetic recording medium for achieving a high-speed and high-density recording density of 40 Gb/in$^2$ or higher and to facilitate the attainment of a high-density recording and reproducing apparatus, by securing (1) a high-density magnetic recording property, (2) the signal strength from recorded magnetization, and (3) the efficiency of the recording head, which are the characteristics of the magnetic recording system comprising the dual-layer perpendicular magnetic recording medium and the single pole-type recording head, and providing a method for preventing the production of the noise inherent in the magnetic back layer, which has been a big problem heretofore.

To attain a perpendicular magnetic recording medium having a low-noise property, high recording efficiency of a recording head and a high signal output property from a recording bit, the present invention is constituted by a perpendicular magnetic recording medium having a perpendicular magnetization film formed on a non-magnetic substrate via a magnetic back film, in which the magnetic back film comprises two or more soft magnetic films which are separated at least by a non-magnetic layer, the soft magnetic film closer to the perpendicular magnetization film serves as a soft magnetic keeper layer for keeping perpendicular magnetization, and the magnetization of the soft magnetic film(s) closer to the substrate has magnetization orientation(s) different from the above soft magnetic keeper layer.

The magnetic back film in the dual-layer perpendicular magnetic recording medium serves to (1) increase the intensity of magnetization leaked from the surface of the medium while stabilizing the magnetization recorded on the perpendicular magnetization film and (2) increase the recording efficiency of the recording head. The present inventor has found according to experiments and studies that the conventional problems can be solved with the above features intact by multiplying the soft magnetic back layer in a certain multilayer structure.

A description will be given to the structure and effect of the perpendicular magnetic recording medium according to the present invention with reference to FIGS. 1 and 2. FIG. 1 is a cross-sectional schematic diagram of the perpendicular magnetic recording medium according to the present invention, and FIG. 2 exemplarily shows the magnetization orientations in the soft magnetic film at the A-A cross-section and the B-B cross-section. In the present invention, as the fundamental structure of the soft magnetic back film, a structure is employed that comprises a soft magnetic film 17, which serves to increase the intensity of magnetization leaked from the surface of the medium while stabilizing the magnetization recorded on the perpendicular magnetization film, soft magnetic films 13 and 15 supplied for particularly improving the recording efficiency of the recording head, and a non-magnetic layer 16 which is interposed between the film 17 and the films 13 and 15. FIG. 1 shows the structure having two soft magnetic films of the latter type.

It is known that the spike noise inherent in the dual-layer perpendicular recording medium is manufactured with regard to the magnetic domain boundary generated in the soft magnetic back film. In the present invention, as shown in FIG. 2, the magnetization orientations 20 and 21 of the soft magnetic films 13 and 15 which take up the main portion of the soft magnetic back film are made antiparallel to each other, and when the substrate ii is in the form of a disk, the magnetization orientations can be aligned parallel to the circumferential direction of the disk substrate. By setting the magnetization orientations in the circumferential direction, the generation of the magnetic domain boundary causing the noise can be suppressed. Further, as shown in FIG. 1, the soft magnetic films 13 and 15 adjacent to each other via a non-magnetic layer 14 are characterized in that they are apt to be magnetically coupled such that they are antiparallel to each other in terms of magnetic energy. Even when two or more of the magnetic films are formed, the above antiparallel relationship is apt to be established. It is desirable that an adhesion-reinforcing layer 12 be generally formed between the substrate 11 and the first soft magnetic film 13. By forming a plurality of the layers 12 and incorporating anti-ferromagnetic films and ferromagnetic films for fixing the magnetization orientations of the soft magnetic films into the plurality of the layers, a more desirable practical effect can be obtained.

To define the magnetization orientation of the soft magnetic film in the circumferential direction of the disk substrate, a magnetic field that spins in the circumferential direction of the disk substrate may be applied during or after the formation process of the thin-film. This is achieved by utilizing the phenomenon which is caused by placing an electric conductive wire in such a position that it passes through the hole made in the central portion of the disk at a right angle and generating a magnetic field in the form of a concentric circle around the wire by passing an electric current through the wire.

Further, on these soft magnetic films 13 and 15, a soft magnetic layer 17 which serves to increase the intensity of magnetization leaked from the surface of the medium while stabilizing the magnetization recorded on a perpendicular magnetization film 18 is formed via the non-magnetic film 16. This soft magnetic film 17 serves not only to increase the recording efficiency of the recording head as does the above soft magnetic film in magnetic recording by the recording head but also to stabilize recorded magnetization by forming a closed magnetic path corresponding to the state of the recorded magnetization underneath the magnetic domains formed in the perpendicular magnetization film 18 as shown in FIG. 1. This soft magnetic film 17 amplifies the intensity of magnetization from the surface of the medium by forming magnetically continuous horseshoe-shaped magnets by adjacent magnetic domains formed in the perpendicular magnetization film 18 underneath the domains.

The soft magnetic film 17 which serves as described above is not necessarily as thick as the conventionally known soft magnetic film. Further, a film for controlling the crystal growth of the perpendicular magnetization film may be formed between the soft magnetic film 17 and the perpendicular magnetization film 18. However, to take advantage of the characteristics of the dual-layer perpendicular magnetization film, care must be taken such as to ensure that the thickness of the film for controlling the crystal growth should be set to be thinner than the shortest bit length in magnetic recording. Further, in order not to deteriorate the magnetic recording property, this film is preferably made of a weak magnetic material having a saturation magnetization of not higher than 50 emu/cc or non-magnetic material.

According to the experiments and studies made by the present inventor, it has been found that the condition which amplifies the intensity of magnetization from the surface of the medium but does not allow the spike noise to be noticeable depends on the linear recording density of magnetic recording, when the saturation magnetization and thickness of the soft magnetic film formed underneath the perpendicular magnetic film are defined as $Bs_m$ and t, respectively. When the shortest bit length in magnetic recording and the average saturation magnetization of the perpendicular magnetic film are defined as Bmin and Ms, respectively, $0.5 \, Bmin \cdot Ms \leq Bs_m \cdot t$ must be satisfied. For example, when the maximum linear recording density is defined as 500 kFCI (kilo Flux Change per. Inch), the average saturation magnetization of the perpendicular magnetic film as 0.4 T and the saturation magnetization of the soft magnetic film as 1 T, its thickness, t, satisfies $10 \, nm \leq t$. When $Bs_m \cdot t$ becomes smaller than $0.5 \, Bmin \cdot Ms$, the above effect becomes weak, and the intensity of magnetization from the surface of the medium lowers to a value which is almost the same as that when the single-layer perpendicular recording medium is used. Further, the maximum value of t does not so much depend on the recording density and the magnitude of the saturation magnetization of the soft magnetic film, and when it is higher than or equal to 100 nm, the thickness of the soft magnetic film increases, and the magnetic domains irrelevant to the information on the perpendicular magnetization supplied to the soft magnetic film are liable to be formed and become the sources of the spike noises. Further, a soft magnetic material having a larger saturation magnetization $Bs_m$ is preferably used in order to bring about the effect of output amplification by reducing the thickness of the film. It is effective to use a material having larger saturation magnetization than that of the soft magnetic film(s) that serves to promote the recording efficiency of the head mounted on the substrate side.

Further, when the thickness and saturation magnetization of the m-th soft magnetic film including the soft magnetic films formed in the vicinity of the perpendicular magnetization film is defined as $T_m$ and $Bs_m$, respectively, and the saturation magnetization ($Bs_h$) and track width (Tw) of the magnetic pole material for the recording head are considered, it is desirable that $0.16Bs_h \cdot Tw \leq \Sigma(Bs_m \cdot T_m)$ be satisfied. When $0.16Bs_h \cdot Tw > \Sigma(Bs_m \cdot T_m)$, there occur such problems that the recording efficiency of the recording head lowers and that demagnetization in recording becomes noticeable. Further, although the recording efficiency improves as the total thickness of the soft magnetic films increases, the increase in the film thickness is accompanied by an increase in the degree of roughness on the medium surface or the like. Therefore, it is desirable that $\Sigma(Bs_m \cdot T_m) \leq Bs_m \cdot Tw$ be satisfied.

As the perpendicular magnetization film used in the present invention, any conventionally known types of perpendicular magnetization films can be used. That is, as the perpendicular magnetization film, there can be used a polycrystal film made of a Co alloy, a Co—Pt alloy and an Fe—Pt alloy, a polycrystal multilayer film made of a Co—Co alloy and a Pt—Pt alloy, a polycrystal multilayer film made of a Co—Co alloy and a Pd—Pd alloy, or the like. Further, a perpendicular magnetization film comprising an amorphous film containing rare earth elements can also be used.

As the soft magnetic material, there can be used Fe group-based alloys such as Fe—Ni, Fe—Si, Fe—Al, Fe—Al—Si and Fe—Cr alloys, Ni group-based alloys such as Ni—Fe and Ni—Mn alloys, Co group-based alloys such as Co—Nb, Co—Zr and Co—Fe alloys, or a soft ferrite represented by $MO \cdot Fe_3O_4$ (M=Fe, Mn, Ni, Co, Mg, Zn or Cd). Particularly, as the soft magnetic film formed in the vicinity of the perpendicular magnetization film, there can be suitably used Fe group-based alloys such as Fe—Ta—C, Fe—Si—Al, Fe—Co—C, Fe—Si—B, Fe—B—C and Fe—B—C—Si alloys, and Co group-based alloys such as Co—Nb—Zr, Co—Mo—Zr, Co—Ta—Zr, Co—W—Zr, Co—Nb—Hf, Co—Mo—Hf, CoTa—Hf and Co—W—Hf alloys, all of which are capable of forming a soft magnetic film that has a high saturation magnetization of not lower than 1 T and is amorphous or microcrystalline. When this material is amorphous or microcrystalline, the crystal grains of the perpendicular magnetization film formed thereon are also liable to become minute, and such a material is suitable for imparting high perpendicular magnetic anisotropy.

As the non-magnetic material interposed between the soft magnetic films, there can be used an element selected from the group consisting of B, C, Mg, Al, Si, Ti, V, Cr, Cu, Zr, Nb, Mo, Ru, Hf, Ta, w and Au, an alloy comprising these elements as main components, a compound selected from the group consisting of $Si_3N_4$, BN, $B_4C$, MO, $Al_2O_3$, $SiO_2$, CaO, $ZrO_2$ and MgO, or a mixed crystal comprising these compounds. To improve the high-frequency recording property of magnetic recording, a non-magnetic material having high electric resistance, that is, a material selected from the group consisting of B, C, Si, $Si_3N_4$, BN, $B_4C$, NiO, $Al_2O_3$, $SiO_2$ and CaO or a mixed crystal material comprising any of these materials as main components, is suitably used.

Figure 1:
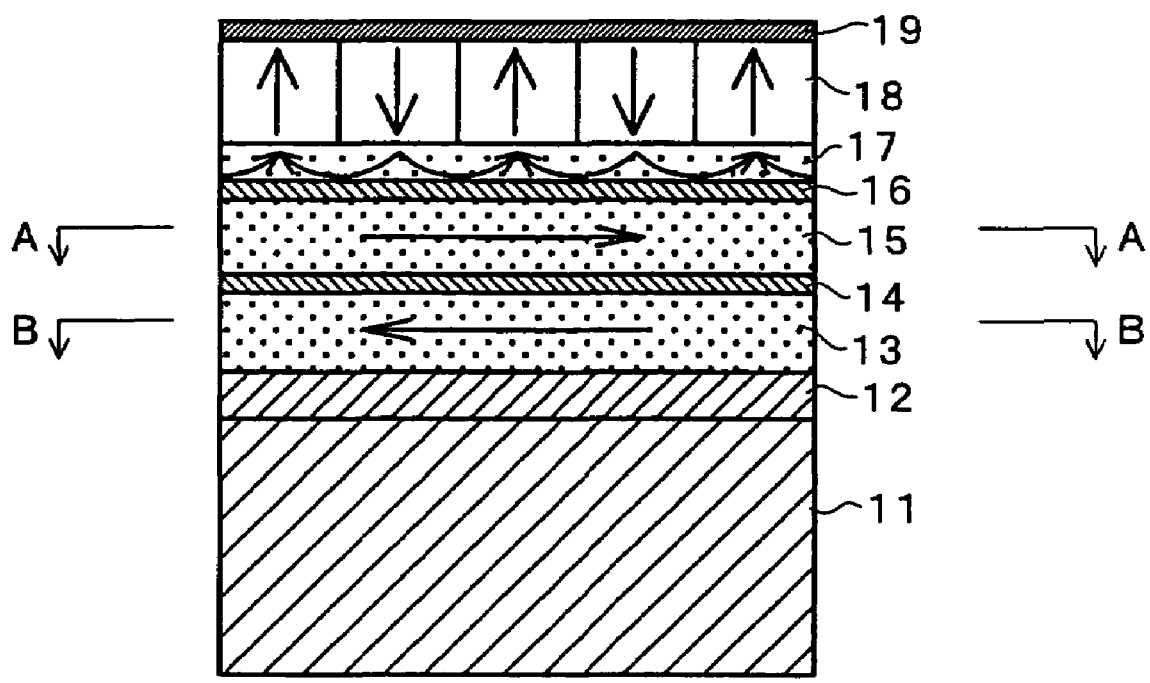
FIG. 1 is a cross-sectional schematic diagram illustrating an example of the perpendicular magnetic recording media according to the present invention.

Reference numeral 11 denotes a substrate, 12 an anti-ferromagnetic material film, 13 a soft magnetic film, 14 a non-magnetic material layer, 15 a soft magnetic film, 16 a non-magnetic film, 17 a soft magnetic film, 18 a perpendicular magnetization film, 19 a protective film, 20 magnetization orientation, 21 magnetization orientation, 31 a substrate, 32 a non-magnetic film, 33 a soft magnetic film, 34 a non-magnetic film, 35 a soft magnetic film, 36 a non-magnetic film, 37 a soft magnetic film, 38 a film for controlling the crystal growth of the perpendicular magnetization film, 39 a perpendicular magnetization film, 40 a protective film, 61 a substrate, 62 a non-magnetic film, 63 a ferromagnetic layer, 64 a soft magnetic film, 65 a non-magnetic film, 66 a soft magnetic film, 67 a non-magnetic film, 68 a non-magnetic film, 69 a perpendicular magnetization film, 70 a perpendicular magnetization film, 71 a protective film, 72 a substrate, 73 an anti-ferromagnetic material film, 74 a soft magnetic film, 75 a non-magnetic film, 76 a soft magnetic film, 77 a non-magnetic film, 78 a soft magnetic film, 79 a non-magnetic film, 80 a perpendicular magnetization film and 81 a protective film.

DETAILED DESCRIPTION OF THE PREFERRED EMBODIMENT

The following examples will be given to further illustrate the present invention with reference to the drawings.

EXAMPLE 1

A magnetic recording medium having the cross-sectional structure shown in the schematic diagram of FIG. 1 was manufactured by direct-current magnetron sputtering using a glass substrate having a diameter of 2.5 inches. On the substrate 11, an Fe.-50 at % Mn anti-ferromagnetic material film 12 having a thickness of 50 nm, a Co-5 at % Nb-5 at % Zr film having a thickness of 50 nm as the soft magnetic layer 13, a Cu film having a thickness of 3 nm as the non-magnetic material layer 14, a Co-5 at % Nb-5 at % Zr film having a thickness of 50 nm again as the soft magnetic film 15, a C film having a thickness of 10 nm as the non-magnetic film 16, an Fe-8 at % Si-10 at % B film having a saturation magnetization of 1.6 T and a thickness of 30 nm as the soft magnetic film 17, a Co-20 at % Cr-8 at % Pt-3 at % B film having a thickness of 25 nm as the perpendicular magnetization film 18, and a carbon film having a thickness of 5 nm as the protective film 19 were formed in this order, under the conditions of an Ar gas pressure for sputtering of 3 mTorr, a sputtering power of 20 $W/cm^2$ and a substrate temperature of 250° C.

Under the same conditions, the same perpendicular media as described above were manufactured except that Fe-10 at % B-2 at % C, Fe-8 at % B-2 at % C-4 at % Si, Fe-5 at % Ta-3 at % C, Fe-9 at % Si-5 at % Al-1 at % Ni, Co-5 at % Fe-4 at % C and Co-6 at % Fe-4 at % B-10 at % Si alloys were used as the soft magnetic film 17 formed immediately underneath the perpendicular magnetization film 18.

A comparative sample medium 1 was manufactured under the same sputtering conditions by forming a soft magnetic back film comprising a single 300-nm-thick layer of Ni-20 at % Fe permalloy on a glass substrate, and a Co-20 at % Cr-8 at % Pt-3 at % B film having a thickness of 25 nm and a carbon film having a thickness of 5 nm as the protective film 19 thereon. A perpendicular magnetic recording medium was manufactured as a comparative sample medium 2 by forming an Fe-50 at % Mn anti-ferromagnetic material film between the soft magnetic film and substrate of the comparative sample medium 1.

Figure 2:
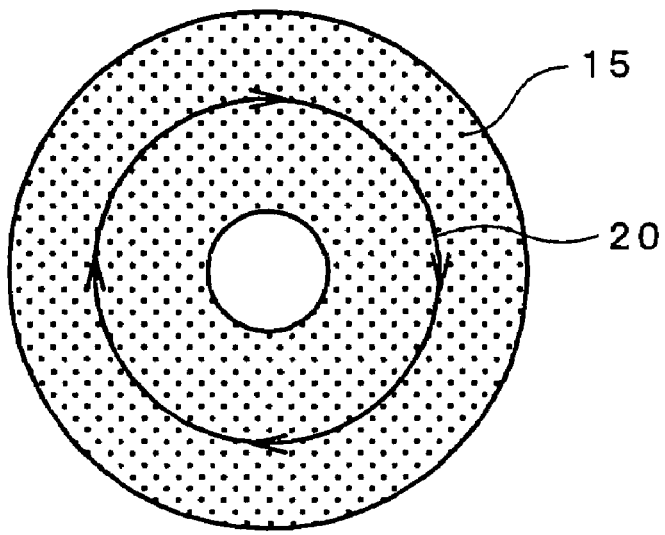
FIG. 2 is a cross-sectional schematic diagram illustrating the magnetization orientations in the soft magnetic layer.
Figure 2:
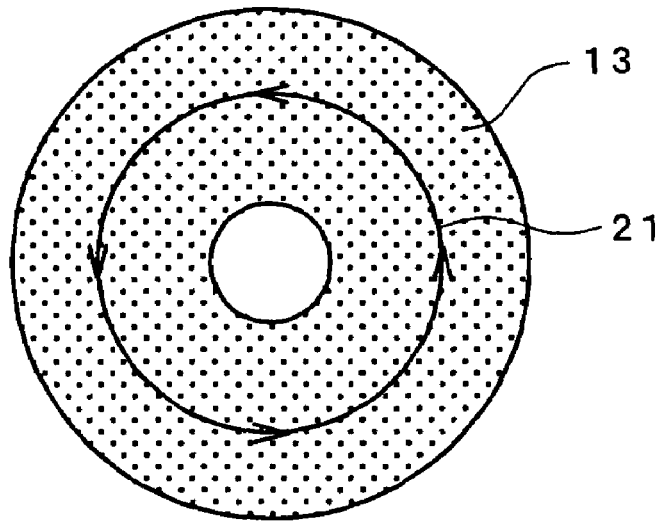

The thus-manufactured perpendicular magnetic recording media were heated in a magnetic field to impart magnetization in the circumferential direction of the disk to the soft magnetic films thereof. The sample media were placed in a vacuum heater, and an electric conductive wire was passed through the hole in the central portion of the disk perpendicularly to the surface of the disk. The heat treatment was carried out in a magnetic field by generating the magnetic field which spun in the circumferential direction of the disk by passing an electric current through the wire while decreasing the temperature of the sample medium from 250° C. to room temperature. When the magnetization orientations of the soft magnetic films were observed by a microscope using an optical Kerr-effect, it was observed that the magnetization orientations, including those of the comparative sample media, were almost aligned parallel to the circumferential direction of the disk as shown in the schematic diagram of FIG. 2.

Then, the recording/reproducing properties of these sample media were evaluated by using a separate-type recording/reproducing magnetic head. The track width of the Fe—Ni alloy magnetic pole of a single pole-type recording head was 0.52 μm, the track width of a giant magnetoresistive effect (GMR) head for reproduction was 0.4 pm, a shield space was 0.08 μm, and spacing at the time of measurement was 0.02 μm. The S/N of the medium when magnetic recording was carried out at 400 kFCI was measured as a relative value to the S/N of the comparative sample medium 1. A recording resolution was measured as a linear recording density $D_{50}$, which was a half of the amplitude of an isolated read pulse. As for recording magnetization intensity, the recording signal output at 400 kFCI was measured as a relative output to the comparative sample medium 1. Further, the frequency of occurrence of the spike noise was measured and evaluated as—when at least one occurrence of the spike noise was detected per track, Δ when at least one occurrence of the spike noise was detected while seeking the recording surface of the disk and ◎ when no spike noise was detected. The results of these measurements are shown in Table 1.

TABLE 1

| | Sample | | | Writing-reading property | | | |
|---|---|---|---|---|---|---|---|
| No. | Fe—50at % Mn film (50 nm) | Soft magnetic film of substrate side | Soft magnetic film of perpendicularly magnetized film side (thickness) | Spike noise | S/N (relative value) | Resolution D50(kFCI) | Intensity of magnetization (relative value) |
| 1 | present | Co—5at % Nb—5at % Zr 2 layers (50 nm × 2) | Fe—8at % Si—10at % B (30 nm) | ◎ | 1.31 | 295 | 1.5 |
| 2 | present | as above | Fe—10at % B—2at % C (30 nm) | ◎ | 1.30 | 290 | 1.3 |
| 3 | present | as above | Fe—8at % B—2at % C—4at % Si (30 nm) | ◎ | 1.33 | 310 | 1.4 |
| 4 | present | as above | Fe—5at % Ta—3at % C (30 nm) | ◎ | 1.29 | 285 | 1.5 |
| 5 | present | as above | Fe—9at % Si—5at % Al—1at % Ni (30 nm) | ◎ | 1.33 | 325 | 1.5 |
| 6 | present | as above | Co—5at % Fe—4at % C (30 nm) | ◎ | 1.31 | 298 | 1.3 |
| 7 | present | as above | Co—6at % Fe—4at % B—10at % Si (30 nm) | ◎ | 1.34 | 314 | 1.4 |
| Control sample 1 | absent | Ni—20at % Fe Single layer film | (300 nm) | X | 1.0 | 240 | 1.0 |
| Control sample 2 | present | Ni—20at % Fe Single layer film | (300 nm) | Δ | 1.15 | 245 | 1.1 |

Table 1

It was found that the magnetic recording media of the present example had less occurrences of the spike noise in particular than the comparative examples and also exhibited improved S/N, recording resolutions and reproduction outputs and that they should be therefore desirable as high-density magnetic recording media.

A 2.5-inch magnetic recording apparatus using a GMR head as a reproducing device was manufactured by using the magnetic recording medium manufactured in the present example. An error rate of $10^{-9}$ was secured at an areal recording density of 40 Gb/in$^2$, and it was confirmed that the apparatus could operate as an ultra high-density recording and reproducing apparatus.

EXAMPLE 2

Figure 3:
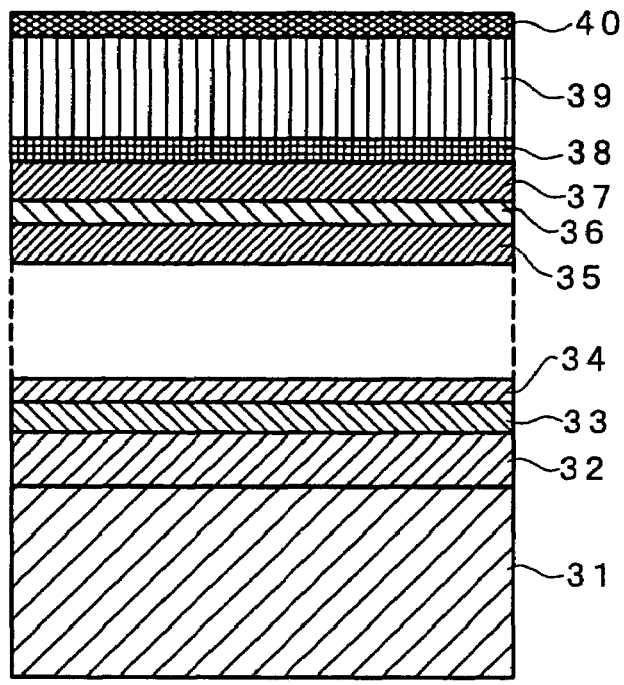
FIG. 3 is a cross-sectional schematic diagram illustrating another example of the perpendicular magnetic recording media according to the present invention.

A perpendicular magnetic recording medium having the cross-sectional structure shown in the schematic diagram of FIG. 3 was manufactured by magnetron sputtering using a silicon substrate having a diameter of 2.5 inches. On the substrate 31, a Cr film having a thickness of 10 nm as the non-magnetic film 32 for reinforcing the adhesion of the thin film, an Fe-50 at % Co film having a thickness of 10 nm as the soft magnetic film 33 and an Ru film having a thickness of 3 nm as the non-magnetic film 34 were laminated in this order, and these films were further laminated in this order 9 more times. Thereafter, the Fe-50 at % Co film 35 having a thickness of 10 nm was laminated thereon, and an Al$_2$O$_3$ film having a thickness of 5 nm was then formed as the non-magnetic film 36. Further, an Fe-5 at % Ta-12 at % C film (saturation magnetization: 1.6 T) having a thickness of 50 nm as the soft magnetic film 37, a Ti-5 at % Cr film having a thickness of 10 nm as the film 38 for controlling the crystal growth of the perpendicular magnetization film, a Co-20 at %

Cr-8 at % Pt-3 at % B film (saturation magnetization: 0.4 T) having a thickness of 25 nm as the perpendicular magnetization film 39, and a carbon film having a thickness of 5 nm as the protective film 40 were formed. The perpendicular magnetic recording medium was manufactured under the conditions of an Ar gas pressure for sputtering of 3 mTorr, a sputtering power of 10 W/cm$^2$ and a substrate temperature of 310° C. Under the same conditions, sample media were manufactured having the same structure as described above except that the thickness of the Fe-4 at % Ta-3 at % Si-2 at % soft magnetic film 37 formed in the vicinity of the perpendicular magnetization film varied between 0 and 300 nm.

The thus-manufactured perpendicular magnetic recording media were heat-treated in a magnetic field to impart magnetization in the circumferential direction of the disk to the soft magnetic films thereof. The sample media were placed in a vacuum heater, and an electric conductive wire was passed through the hole in the central portion of the disk perpendicularly to the surface of the disk. The heat treatment was carried out in a magnetic field by generating the magnetic field which spun alternately in the circumferential direction of the disk by passing an alternating current through the wire while decreasing the temperature of the sample medium from 250° C. to room temperature. When the magnetization orientations of the soft magnetic films were observed at the cross-sections of the peripheral portion of the disk by a microscope using an optical Kerr-effect, it was observed that the magnetizations of the soft magnetic films were antiparallel to each other via the non-magnetic layer and almost aligned parallel to the circumferential direction of the disk.

Further, a single-layer perpendicular magnetic recording medium was manufactured as a comparative sample medium by forming a Ti-5 at % Cr film having a thickness of 10 nm as the film 38 for controlling the crystal growth of the perpendicular magnetization film, a Co-20 at % Cr-8 at % Pt-3 at % B film (saturation magnetization: 0.4 T) having a thickness of 25 nm as the perpendicular magnetization film 39, and a carbon film having a thickness of 5 nm as the protective film 40 on a silicon substrate having a diameter of 2.5 inches. The term "single-layer perpendicular magnetic recording medium" as used here means a single-layer perpendicular magnetic recording medium having no back layer as described above.

Then, the recording/reproducing properties of the perpendicular magnetic recording media having the soft magnetic films were evaluated by using a separate-type recording/reproducing magnetic head. The track width of the Fe—Ni alloy magnetic pole of a single pole-type recording head was 0.52 μm, the track width of a giant magnetoresistive effect (GMR) head for reproduction was 0.4 μm, a shield space was 0.08 μm, and spacing at the time of measurement was 0.15 μm. Further, for the magnetic recording of the single-layer perpendicular magnetic recording medium as the comparative sample medium, a thin-film ring head having a track width of 0.52 μm was used under the same spacing conditions as described above. For detecting the reproduction output from the single-layer perpendicular medium, a giant magnetoresistive effect (GMR) head (track width: 0.4 μm, shield space: 0.08 μm) was used at a spacing of 0.15 μm. The reproduction outputs when magnetic recordings were carried out at 250 kFCI and 500 kFCI were measured and compared with the reproduction output from the single-layer perpendicular medium. Further, the frequencies of occurrence of the spike noise from the perpendicular magnetic recording media having the soft magnetic films were measured. In this measurement, the number of occurrences of the spike noise per track of the disk sample was measured. The number of occurrences of the spike noise on 10 tracks was measured by moving the position of the magnetic head at a pitch of 1 μm on the disk in a radial direction thereof. In the case of the single-layer perpendicular medium, this spike noise was not detected at all. The results of these measurements are shown in FIGS. 4 and 5.

Figure 4:
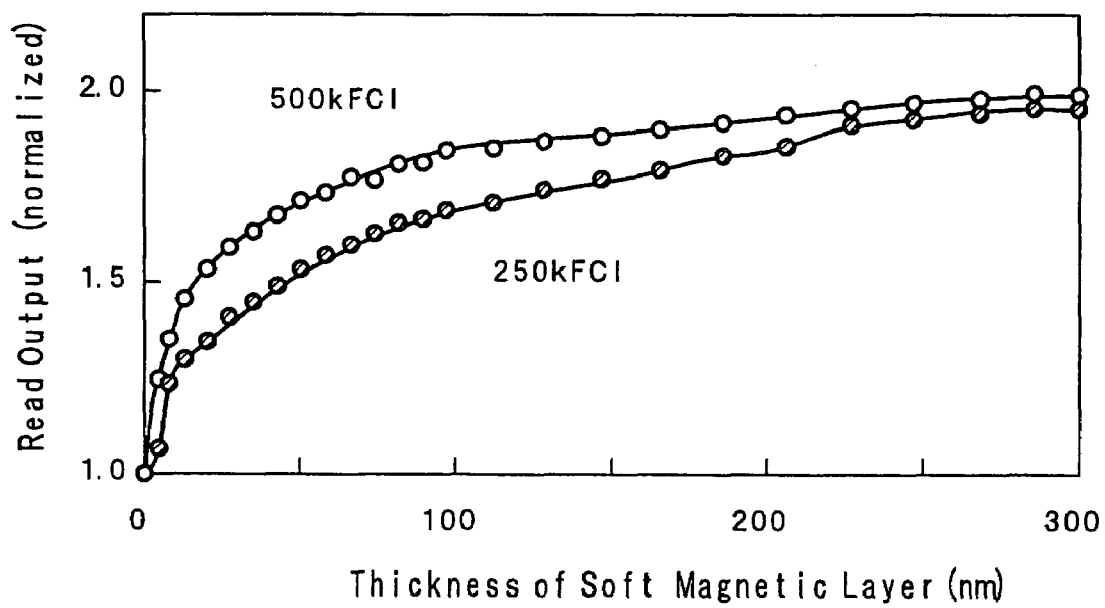
FIG. 4 is a diagram showing the result of evaluation of the magnetic recording medium.
Figure 5:
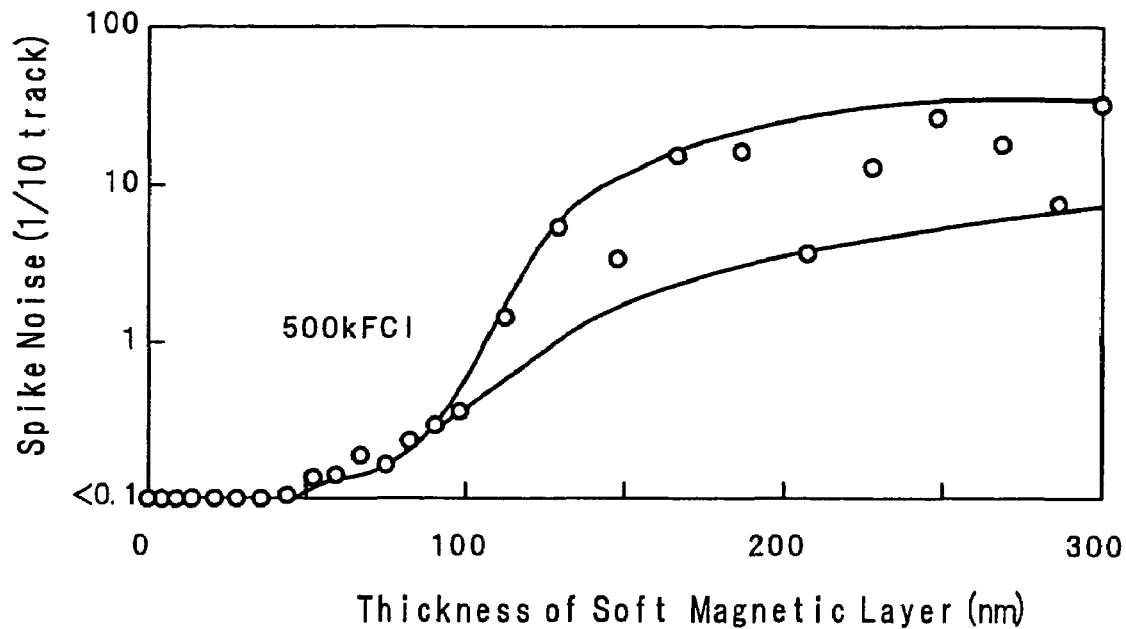
FIG. 5 is a diagram showing the result of evaluation of the magnetic recording medium.

As for the relationship between the reproduction output of the recording signal and the thickness of the soft magnetic film, there was seen the tendency that the reproduction output increased as the thickness of the soft magnetic film increased as shown in FIG. 4. The reproduction output was at least 1.25 times as much as that of the recording signal of the single-layer perpendicular medium when the film thickness was 6 nm or larger at a linear recording density of 500 kFCI or when the film thickness was 12 nm or larger at a linear recording density of 250 kFCI, and the marked effect due to the soft magnetic back layer was recognized. As for the frequency of occurrence of the spike noise, it was found that it occurred at least once on 10 tracks when the thickness of the soft magnetic film is 100 nm or larger as shown in FIG. 5.

That is, when the shortest bit length in magnetic recording and the average saturation magnetization of the perpendicular magnetic film were expressed as Bmin and Ms, respectively, the range of $0.5 \text{ Bmin·Ms} \leq B5_m$ must be satisfied to obtain the reproduction output which was at least 1.25 times as much as that in recording on the single-layer perpendicular magnetization film, and the markedly frequent occurrence of the spike noise was recognized when the thickness of the soft magnetic film became almost 10 nm or larger.

Further, a 2.5-inch magnetic recording apparatus using a GMR head as a reproducing device was manufactured by using the magnetic recording medium manufactured in the present example. An error rate of $10^{-9}$ was secured at an areal recording density of 40 Gb/in$^2$ comprising a maximum linear recording density of 500 kBPI (Bit per Inch) and a track density of 80 kTPI (Track per Inch), and it was confirmed that the apparatus could operate as an ultra high-density recording and reproducing apparatus.

EXAMPLE 3

Figure 6:
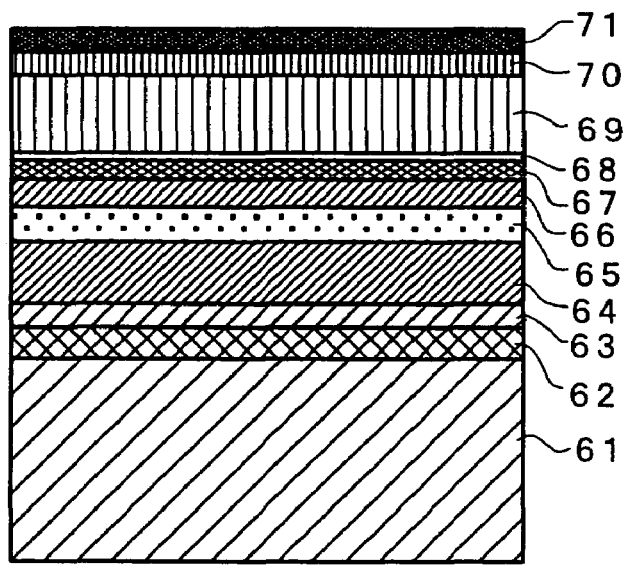
FIG. 6 is a cross-sectional schematic diagram illustrating another example of the perpendicular magnetic recording media according to the present invention.

A perpendicular magnetic recording medium having the cross-sectional structure shown in FIG. 6 was manufactured by magnetron sputtering using a glass substrate having a diameter of 2.5 inches. On a substrate 61, a Cr non-magnetic layer 62 having a thickness of 10 nm, a Co-21 at % Cr-12 at % Pt-2 at % Ta ferromagnetic layer 63 having a thickness of 15 nm, a Co-6 at % Nb-3 at % Zr soft magnetic film 64 having a thickness of 150 nm, a Si-15 at % B non-magnetic film 65 having a thickness of 8 nm, an Fe-4 at % Si-3 at % Al soft magnetic film 66 having a thickness of 40 nm, a Si non-magnetic film 67 having a thickness of 5 nm, a Co-35 at % Cr-15 at % Ru non-magnetic film 68 having a thickness of 5 nm, a Co-21 at % Cr-12 at % Pt-2 at % Ta perpendicular magnetization film 69 having a thickness of 20 nm, the Co-17 at % Cr-16 at % Pt perpendicular magnetization film 70 having a thickness of 2 nm, and the carbon film 71 having a thickness of 4 nm as a protective film were formed successively to form the perpendicular magnetic recording medium. The intensity of the saturation magnetization of the soft magnetic film formed closer to the substrate was 1 T and the intensity of the saturation magnetization of the soft magnetic film formed closer to the perpendicular magnetization film was 1.4 T, setting the saturation magnetization value of the latter to be larger.

Further, perpendicular magnetic recording media were manufactured having the same structure as described above except that a Co-5 at % Nb-2 at % Zr film, a Co-4.5 at % Ta-3 at % Zr film, a Co-4 at % Mo-3 at % Zr film, a Co-4 at % W-3 at % Zr film, a Co-4 at % Nb-3 at % Hf film, a Cu3.5 at % Ta-2 at % Hf film, a Co-3 at % Mo-3 at % Hf film, and a Co-3.2 at % W-3 at % Hf film, all of which had a saturation magnetization of not lower than 1.1 T, were formed in place of the above Fe-4 at % Si-3 at % Al soft magnetic film 66.

Further, perpendicular magnetic recording media were manufactured having the same structure as described above except that a Co-50 at % Pt single-layer film (film thickness: 20 nm), an Fe-50 at % Pt single-layer film (film thickness: 20 nm), {Co: 2 nm)/(Pt: 1 nm)}$_{10}$ multilayer film, {(Co-16 at % Cr-4 at % Ta: 2 nm)/(Pt: 1 nm))}$_{10}$ multilayer film, {(Co-20 at % Cr-6 at % B: 2 nm)/(Pd: 1 nm)}$_{10}$ multilayer film, and a Tb-12 at % Fe-15 at % Co amorphous perpendicular magnetization film (film thickness: 25 nm) were formed in place of the laminated perpendicular magnetization films 69 and 70 shown in FIG. 6. As for the expressions of the multilayer films, in the case of the {(Co: 2 nm)/(Pt: 1 nm)}$_{10}$ multilayer film, for example, the expression represents a structure having 10 pairs of a Co film having a thickness of 2 nm and a Pt film having a thickness of 1 nm laminated.

The thus-manufactured perpendicular magnetic recording media were heat-treated in a magnetic field to impart magnetization in the circumferential direction of the disk to the soft magnetic films thereof. The sample media were placed in a vacuum heater, and an electric conductive wire was passed through the hole in the central portion of the disk perpendicularly to the surface of the disk. The heat treatment was carried out in a magnetic field by generating the magnetic field which spun clockwise in the circumferential direction of the disk by passing a direct current through the wire while decreasing the temperature of the sample medium from 300° C. to room temperature. When the magnetization orientations of the soft magnetic films were observed at the cross-sections of the peripheral portion of the disk by a microscope using an optical Kerr-effect, it was observed that the magnetizations of the soft magnetic films were almost aligned parallel to the clockwise circumferential direction of the disk.

Further, a perpendicular magnetic recording medium was manufactured as a comparative example by forming a Cr non-magnetic layer 62 having a thickness of 10 nm, a Co-21 at % Cr-12 at % Pt-2 at % Ta ferromagnetic layer 63 having a thickness of 15 nm, a Co-6 at % Nb-3 at % Zr soft magnetic film 64 having a thickness of 200 nm, a Si non-magnetic film 67 having a thickness of 5 nm, a Co-35 at % Cr-15 at % Ru non-magnetic film 68 having a thickness of 5 nm, a Co-21 at % Cr-12 at % Pt-2 at % Ta perpendicular magnetization film 69 having a thickness of 20 nm, a Co-17 at % Cr-16 at % Pt perpendicular magnetization film 70 having a thickness of 2 nm, and a carbon film 71 having a thickness of 4 nm as the protective film successively on the substrate 61.

Then, the recording-reproduction properties of these sample media were evaluated by using a separate-type recording/reproducing magnetic head. The track width of the Fe—Ni alloy magnetic pole of a single pole-type recording head was 0.52 μm, the track width of a giant magnetoresistive effect (GMR) head for reproduction was 0.4 μm, a shield space was 0.08 μm, and spacing at the time of measurement was 0.02 μm. The S/N of the medium when magnetic recording was carried out at 400 a relative value to the S/N of the comparative sample medium. A resolution was measured as a linear recording density $D_{50}$, which was a half of the amplitude of an isolated read pulse. As for recording magnetization intensity, the recording signal output at 400 kFCI was measured as a relative output to the comparative sample medium. Further, the frequency of occurrence of the spike noise was measured and evaluated as when at least one occurrence thereof was detected per track, O when the occurrence thereof was not less than 0.1 and less than 1, and ◎ when the occurrence thereof was less than 0.1. The results of these measurements are shown in Table 2. Incidentally, in Table 2, the expression {(Co: 2 nm)/(Pt: 1 nm)}$_{10}$, for example, represents a multilayer film having 10 pairs of a Co film having a thickness of 2 nm and a Pt film having a thickness of 1 nm laminated.

TABLE 2

| Sample | Magnetic film composing medium | | | | Writing-reading property | | |
|---|---|---|---|---|---|---|---|
| | Soft magnetic film | | Perpendicularly magnetized film | | Resolution D50 (kFCI) | S/N (relative value) | Spike noise |
| 1 | Co—6at % Nb—3at % Zr (150 nm) | Fe—4at % Si—3at % Al (40 nm) | Co—21at % Cr—12at % Pt—2at % Ta (20 nm) | Co—17at % Cr—16at % Pt (2 nm) | 315 | 1.43 | ◎ |
| 2 | Co—6at % Nb—3at % Zr (150 nm) | Fe—4at % Si—3at % Al (40 nm) | Co—50at % Pt (20 nm) | — | 275 | 1.21 | O |
| 3 | Co—6at % Nb—3at % Zr (150 nm) | Fe—4at % Si—3at % Al (40 nm) | Fe—50at % Pt (20 nm) | — | 286 | 1.20 | O |
| 4 | Co—6at % Nb—3at % Zr (150 nm) | Fe—4at % Si—3at % Al (40 nm) | {(Co: 2 nm)/(Pt: 1 nm)}10 | — | 284 | 1.22 | O |
| 5 | Co—6at % Nb—3at % Zr (150 nm) | Fe—4at % Si—3at % Al (40 nm) | {(Co—16at % Cr—4at % Ta: 2 nm)/(Pt: 1 nm)}10 | — | 298 | 1.26 | ◎ |
| 6 | Co—6at % Nb—3at % Zr (150 nm) | Fe—4at % Si—3at % Al (40 nm) | {(Co—20at % Cr—6at % B: 2 nm)/(Pd: 1 nm)}10 | — | 294 | 1.30 | ◎ |
| 7 | Co—6at % Nb—3at % Zr (150 nm) | Fe—4at % Si—3at % Al (40 nm) | Tb—12at % Fe—15at % Co (25 nm) | — | 283 | 1.29 | ◎ |
| 8 | Co—6at % Nb—3at % Zr (150 nm) | Co—5at % Nb—2at % Zr (40 nm) | Co—21at % Cr—12at % Pt—2at % Ta (20 nm) | Co—17at % Cr—16at % Pt (2 nm) | 310 | 1.41 | ◎ |
| 9 | Co—6at % Nb—3at % Zr (150 nm) | Co—4.5at % Ta—3at % Zr (40 nm) | Co—21at % Cr—12at % Pt—2at % Ta (20 nm) | Co—17at % Cr—16at % Pt (2 nm) | 312 | 1.46 | ◎ |

TABLE 2-continued

| Sam- | Magnetic film composing medium | | | | Writing-reading property | | |
|---|---|---|---|---|---|---|---|
| | Soft magnetic film | | Perpendicularly magnetized film | | Resolution D50 (kFCI) | S/N (relative value) | Spike noise |
| 10 | Co—6at % Nb—3at % Zr (150 nm) | Co—4at % Mo—3at % Zr (40 nm) | Co—21at % Cr—12at % Pt—2at % Ta (20 nm) | Co—17at % Cr—16at % Pt (2 nm) | 305 | 1.44 | ◎ |
| 11 | Co—6at % Nb—3at % Zr (150 nm) | Co—4at % W—3at % Zr (40 nm) | Co—21at % Cr—12at % Pt—2at % Ta (20 nm) | Co—17at % Cr—16at % Pt (2 nm) | 302 | 1.35 | ◎ |
| 12 | Co—6at % Nb—3at % Zr (150 nm) | Co—4at % Nb—3at % Hf (40 nm) | Co—21at % Cr—12at % Pt—2at % Ta (20 nm) | Co—17at % Cr—16at % Pt (2 nm) | 311 | 1.31 | ◎ |
| 13 | Co—6at % Nb—3at % Zr (150 nm) | Co—3.5at % Ta—2at % Hf (40 nm) | Co—21at % Cr—12at % Pt—2at % Ta (20 nm) | Co—17at % Cr—16at % Pt (2 nm) | 298 | 1.29 | ◎ |
| 14 | Co—6at % Nb—3at % Zr (150 nm) | Co—3at % Mo—3at % Hf (40 nm) | Co—21at % Cr—12at % Pt—2at % Ta (20 nm) | Co—17at % Cr—16at % Pt (2 nm) | 316 | 1.30 | ○ |
| 15 | Co—6at % Nb—3at % Zr (150 nm) | Co—3.2at % W—3at % Hf (40 nm) | Co—21at % Cr—12at % Pt—2at % Ta (20 nm) | Co—17at % Cr—16at % Pt (2 nm) | 321 | 1.33 | ○ |
| 16 (Comparison) | Co—6at % Nb—3at % Zr (200 nm) | — | Co—21at % Cr—12at % Pt—2at % Ta (20 nm) | Co—17at % Cr—16at % Pt (2 nm) | 265 | 1.0 (Base value) | X |

It was found that the magnetic recording media of the present example had large resolutions and S/N and less occurrences of the spike noise, which was apt to occur from the soft magnetic back film, than the comparative sample medium and that they should therefore be desirable as high-density magnetic recording media.

A 2.5-inch magnetic recording apparatus using a high-sensitive reproducing head to which a magnetic tunnel phenomenon was applied as a reproducing device was manufactured by using the magnetic recording medium manufactured in the present example. An error rate of $10^{-8}$ was secured at an areal recording density of 40 Gb/in$^2$ for all the sample media, and it was confirmed that the apparatus could operate as an ultra high-density recording and reproducing apparatus.

EXAMPLE 4

Figure 7:
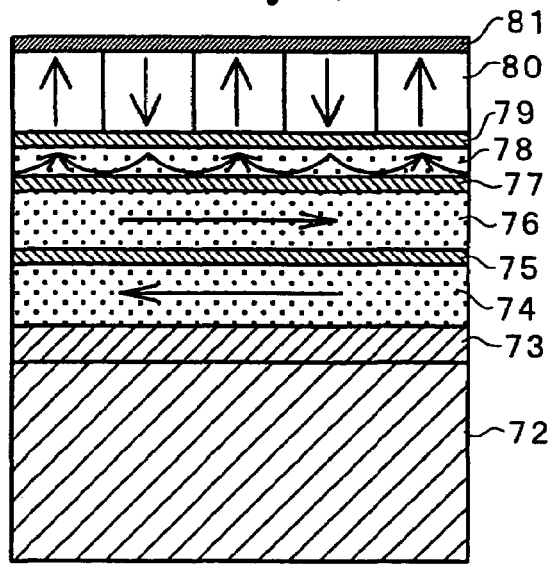
FIG. 7 is a cross-sectional schematic diagram illustrating another example of the perpendicular magnetic recording media according to the present invention.

A perpendicular magnetic recording medium having the cross-sectional structure shown in FIG. 7 was manufactured by forming a NiO anti-ferromagnetic film 73 having a thickness of 20 nm, a Fe-25 at % Ni soft magnetic film 74 having a thickness of 100 nm, a Sl$_3$N$_4$ non-magnetic film 75 having a thickness of 5 nm, a Co-6 at % Nb-3 at % Zr soft magnetic film 76 having a thickness of 100 nm, a SiO$_2$ non-magnetic film 77 having a thickness of 5 nm, an Fe-5 at % Ta-10 at % C soft magnetic film 78 having a thickness of 20 nm, a Ge film 79 having a thickness of 5 nm, a Co-18 at % Cr-12 at % Pt-1 at % Si-3 at % B perpendicular magnetization film 80 having a thickness of 20 nm, and a carbon protective film 81 having a thickness of 5 nm on a glass substrate having a diameter of 1.8 inches.

Further, perpendicular magnetic recording media were manufactured having the same structure as described above except that B, C, Mg, Al, Si, Ti, V, Cr, Cu, Zr, Nb, Mo, Ru, Hf, Ta, W, Au, Al-10 at % Mg, Si-2 at % Ti, Ti-15 at % V, Cu-5 at % Ag, Au-50 at % Ag, BN, B.sub.4C, NiO, Al$_2$O$_3$, SiO$_2$, CaO, ZrO$_2$, MgOCaO, SiO$_2$~ZrO$_2$ and SiO$_2$—CaO were used as a non-magnetic material film in place of the above Sl$_3$N$_4$ non-magnetic film 75. Then, as a comparative sample medium, a perpendicular magnetic recording medium was manufactured by forming an Fe-25 at % Ni single-layer film having a thickness of 200 nm directly on a glass substrate similar to the one used above and then forming a Ge film having a thickness of 5 nm, a Co-18 at % Cr-12 at % Pt-1 at % Si-3 at % B perpendicular magnetization film having a thickness of 20 nm, and a carbon protective film having a thickness of 5 nm thereon. These perpendicular magnetic recording media were heat-treated in a magnetic field in the same manner as in Example 3. The media S/N and spike noises of these magnetic recording media were measured under the same conditions as used in Example 1. The results are shown in Table 3.

TABLE 3

| Sample | | Recording-reproduction property | |
|---|---|---|---|
| No. | Non-magnetic Film material | Spike Noise | S/N (relative value) |
| 1 | Si3N4 | ◎ | 1.32 |
| 2 | B | ◎ | 1.31 |
| 3 | C | ◎ | 1.34 |
| 4 | Mg | ◎ | 1.29 |
| 5 | Al | ◎ | 1.35 |
| 6 | Si | ◎ | 1.36 |
| 7 | Ti | ◎ | 1.30 |
| 8 | V | ◎ | 1.28 |
| 9 | Cr | ◎ | 1.29 |
| 10 | Cu | ◎ | 1.30 |
| 11 | Zr | ◎ | 1.32 |
| 12 | Nb | ◎ | 1.34 |
| 13 | Mo | ◎ | 1.33 |
| 14 | Ru | ◎ | 1.38 |
| 15 | Hf | ◎ | 1.36 |
| 16 | Ta | ◎ | 1.32 |
| 17 | W | ◎ | 1.29 |
| 18 | Au | ◎ | 1.31 |
| 19 | Al—10at % Mg | ◎ | 1.36 |
| 20 | Si—2at % Ti | ◎ | 1.36 |
| 21 | Ti—15at % V | ◎ | 1.33 |
| 22 | Cu—5at % Ag | ◎ | 1.35 |
| 23 | Au—50at % Ag | ◎ | 1.39 |

TABLE 3-continued

| Sample | | Recording-reproduction property | |
|---|---|---|---|
| No. | Non-magnetic Film material | Spike Noise | S/N (relative value) |
| 24 | BN | ◎ | 1.34 |
| 25 | B4C | ◎ | 1.37 |
| 26 | NiO | ◎ | 1.35 |
| 27 | Al2O3 | ◎ | 1.36 |
| 28 | SiO2 | ◎ | 1.32 |
| 29 | CaO | ◎ | 1.27 |
| 30 | ZrO2 | ◎ | 1.29 |
| 31 | MgO.CaO | ◎ | 1.32 |
| 32 | SiO2.ZrO2 | ◎ | 1.33 |
| 33 | SiO2.CaO | ◎ | 1.30 |
| Comparison | absent | X | (1.0) |

As is clear from the experiment results shown in Table 3, the perpendicular magnetic recording media according to the present invention had reduced occurrences of the spike noise and improved the media S/N by 20% to 40% as compared with the comparative example. Further, the states of magnetization at the cross-sections of the perpendicular magnetic recording media according to the present invention and the comparative example were observed by a magnetic force microscope and a Lorentz-type electron microscope. As a result, it was confirmed that all the perpendicular magnetic recording media according to the present invention had the state of magnetization shown in the schematic diagram of FIG. 7. On the other hand, in the comparative example, a number of magnetic domain boundaries irrelevant to the information on recording magnetization were observed particularly in the soft magnetic film. It was assumed that such magnetic domain boundaries were observed as the spike noises in the evaluation of the recording-reproduction properties.

EXAMPLE 5

A plurality of perpendicular magnetic recording media having the cross-sectional structure shown in FIG. 7 were manufactured in the same manner as in Example 4 by forming a Fe-50 at % Pt ferromagnetic film 73 having a thickness of 10 nm, a Fe-25 at % Ni soft magnetic film 74 having a thickness of $T_1$ nm, a Cu non-magnetic film 75 having a thickness of 5 nm, a Co-6 at % Nb-3 at % Zr soft magnetic film 76 having a thickness of $T_2$, a SiO$_2$ non-magnetic film 77 having a thickness of 5 nm, a Fe-5 at % Ta10 at % C soft magnetic film 78 having a thickness of 20 nm, a Ti-10 at % Cr film 79 having a thickness of 5 nm, a Co-18 at % Cr-12 at % Pt-1 at % Si-3 at % B perpendicular magnetization film 80 having a thickness of 20 nm and a carbon protective film 81 having a thickness of 5 nm on a glass substrate 72 having a diameter of 1.8 inches, and by varying the thicknesses ($T_1$ nm and $T_2$ nm) of the Fe-25 at % Ni soft magnetic film 74 and the Co-6 at % Nb-3 at % Zr soft magnetic film 76 within the range of 5 to 200 nm.

When the saturation magnetization values of the soft magnetic films used in the present example were measured, those of the Fe-25 at % Ni soft magnetic film and the Co-6 at % Nb-3 at % Zr soft magnetic film were 1 T and that of the Fe-5 at % Ta-10 at % C soft magnetic film was 1.6 T. These perpendicular magnetic recording media were heat-treated in a magnetic field under the same conditions as used in Example 2, whereby the magnetization orientations of the soft magnetic films were defined to be almost in the circumferential direction of the glass disk substrate.

The recording/reproducing properties of the prototyped perpendicular magnetic recording media were evaluated by using a separate-type recording/reproducing magnetic head. The following four types of magnetic heads were used. Although these four types of magnetic heads used different types of magnetic materials and different track widths of magnetic poles, they all had the same giant magnetoresistive effect (GMR) reproducing head device having a track width of 0.14 μm and a shield space of 0.07 μm as a reproducing device. The single pole-type recording head was constituted by an Fe—Co magnetic pole having a saturation magnetization of 1.6 T (with a track width of 0.15 μm, 0.30 μm, 0.50 μm or 1.0 μm). The recording/reproducing properties were measured at a spacing between the magnetic recording medium and the magnetic head of 0.02 μm. No spike noise was observed in any of the perpendicular magnetic recording media.

Figure 8:
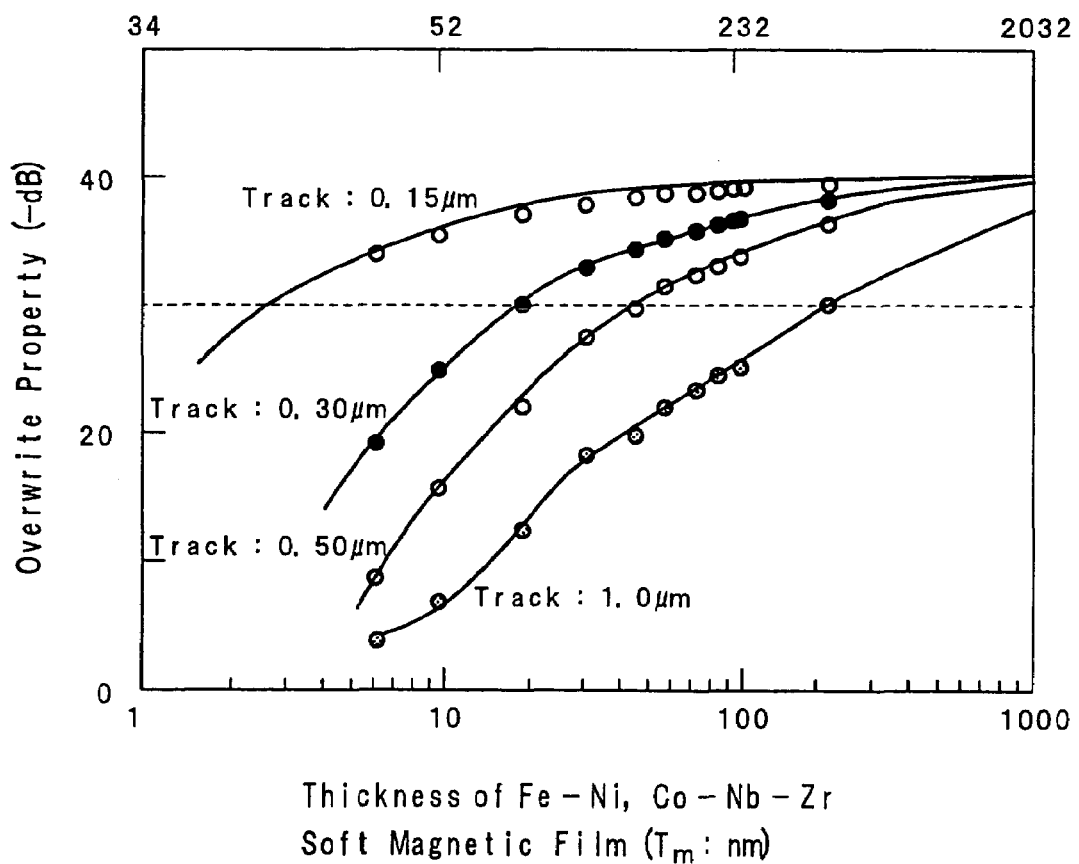
FIG. 8 is a diagram showing the result of evaluation of the magnetic recording medium.

To evaluate the recording efficiency of each of the recording heads to the media, an overwrite (O/W) property was measured. The overwrite property was evaluated by measuring the persistence rate of a high linear recording density signal in decibels when the high linear recording density signal (400 kFCI) was first written on the medium and a low linear recording density (100 kFCI) signal was overwritten thereon. FIG. 8 shows the relationship between the thickness of the perpendicular magnetic recording medium, in which the thicknesses of the Fe—Ni soft magnetic film ($T_1$ nm) and the Co—Nb—Zr soft magnetic film ($T_2$ nm) were varied (with the proviso that $T_1=T_2$) simultaneously within the range of 5 to 200 nm, and the O/W property. The values of $\Sigma(Bs_m \cdot T_m)$ are also shown in the upper portion of FIG. 8. Incidentally, in the $\Sigma(Bs_m \cdot T_m)$ the values of the Fe-5 at % Ta-10 at % C soft magnetic film having a thickness of 20 nm which were formed close to the perpendicular magnetization film was also integrated.

As is clear from FIG. 8, it was found that a good O/W property could be obtained at smaller thicknesses of the soft magnetic films as the track width of the recording head became smaller. To satisfy the expression O/W>30 dB required to be functional as the magnetic recording apparatus, it was found that $0.66Bs \cdot Tw \leq \Sigma(Bs_m \cdot T_m)$ must be satisfied as the relationship between the saturation magnetization ($Bs_h$) and track width (Tw) of the magnetic material for the recording head and the thicknesses and saturation magnetizations of the soft magnetic films of the perpendicular magnetic recording medium. That is, from the viewpoint of the recording efficiency of the single pole-type recording head, it is effective to adjust the thicknesses and degrees of magnetizations of the soft magnetic films incorporated in the perpendicular magnetic recording medium in relation to the target areal recording density. To level the surface of the magnetic recording medium, it was confirmed that the total thickness of the soft magnetic films be desirably as small as possible and that the range defined by the expression $\Sigma(Bs_m \cdot T_m) \leq Bs_m \cdot Tw$ be substantially satisfactory.

An error rate of $10^{-8}$ or less was obtained when the error rate was measured at an areal recording density of 80 Gb/in$^2$ using the perpendicular magnetic recording medium prototyped in the present example and comprising an Fe—Ni soft magnetic film having a thickness of 50 nm, a Co—Nb—Zr soft magnetic film having a thickness of 50 nm and an Fe—Ta—C soft magnetic film having a thickness of 20 nm in combination with a separate-type recording/reproducing magnetic head having a track width for recording of 0.15 μm and a track width for reproducing of 0.14 μm.

According to the present invention, the noise property of the dual-layer perpendicular magnetic recording medium and the recording efficiency of the magnetic head can be improved, whereby a magnetic disk storage device capable of high-speed and high-density magnetic recording, particularly, high-density magnetic recording of 40 Gb/in$^2$ or higher, can be attained and a reduction in the size of the apparatus and an increase in the capacity thereof can be facilitated.

What is claimed is:

1. A perpendicular magnetic recording medium comprising:
   a magnetic back film formed on a substrate; and
   a perpendicular magnetization film formed above the magnetic back film,
   wherein the magnetic back film comprises:
   a plurality of soft magnetic films, and
   a non-magnetic layer inserted between each pair adjacent soft magnetic films, and
   wherein the magnetizations of each soft magnetic film of each pair of adjacent soft magnetic films has an antiparallel magnetization orientation from the other soft magnetic film of said pair of adjacent soft magnetic films.

2. The perpendicular magnetic recording medium according to claim 1, wherein another soft magnetic film formed between the perpendicular magnetization film and the magnetic back film has a thickness of 10 to 100 nm.

3. The perpendicular magnetic recording medium according to claim 2, wherein the soft magnetic film formed between the perpendicular magnetization film and the magnetic back film is selected from the group consisting of Fe—Si—B, Fe—B—C, Fe—B—C—Si, Fe—Ta—C, Fe—Si—Al, Fe—Co—C, Co—Nb—Zr, Co—Mo—Zr, Co—Ta—Zr, Co—W—Zr, Co—Nb—Hf, Co—Mo—Hf, Co—Ta—Hf and Co—W—Hf alloys.

4. The perpendicular magnetic recording medium according to claim 1, wherein a non-magnetic film, an anti-ferromagnetic film or a ferromagnetic film is formed under the magnetic back film.

5. The perpendicular magnetic recording medium according to claim 1, wherein the non-magnetic layer comprises an element selected from the group consisting of B, C, Mg, Al, Si, Ti, V, Cr, Cu, Zr, Nb, Mo, Ru, Hf, Ta, W and Au, an alloy comprising elements B, C, Mg, Al, Si, Ti, V, Cr, Cu, Zr, Nb, Mo, Ru, Hf, Ta, W and Au as main components, a compound selected from the group consisting of $Si_3N_4$, BN, $B_4C$, NiO, $Al_2O_3$, $SiO_2$, CaO, $ZrO_2$ and MgO, or a mixed crystal comprising compounds $Si_3N_4$, BN, $B_4C$, NiO, $Al_2O_3$, $SiO_2$, CaO, $ZrO_2$ and MgO.

* * * * *